March 19, 1929.  H. H. BOYCE  1,705,604
ILLUMINATING DEVICE
Filed June 24, 1922   2 Sheets-Sheet 2
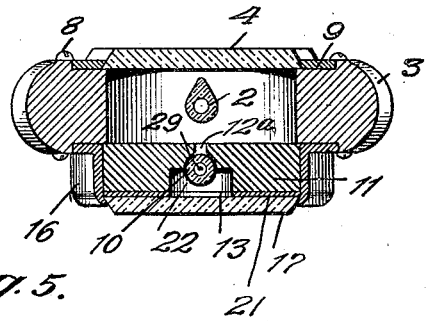
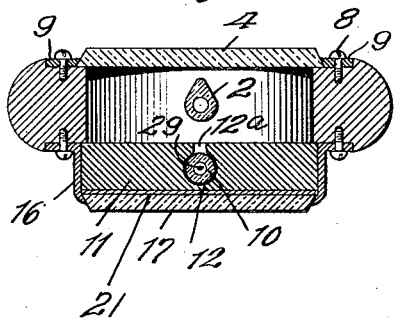
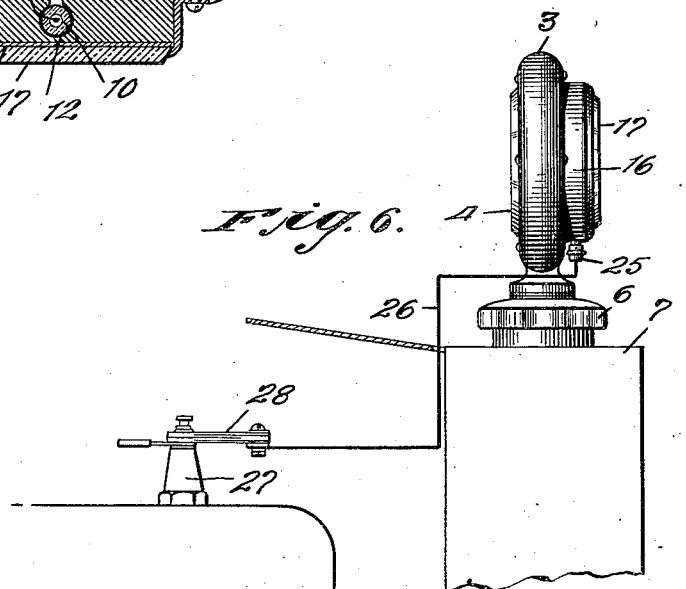
Harrison H. Boyce INVENTOR Patented Mar. 19, 1929.

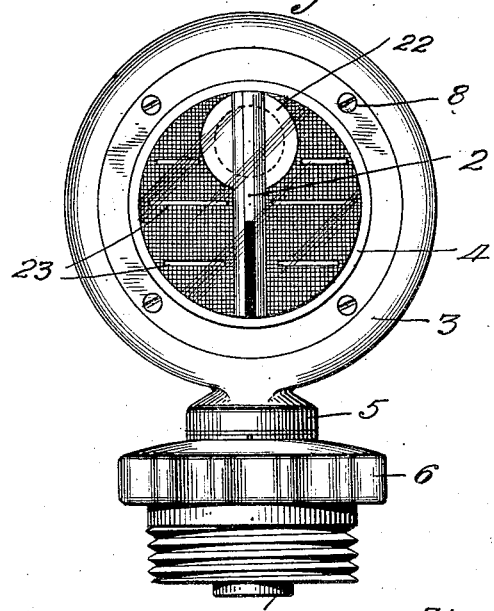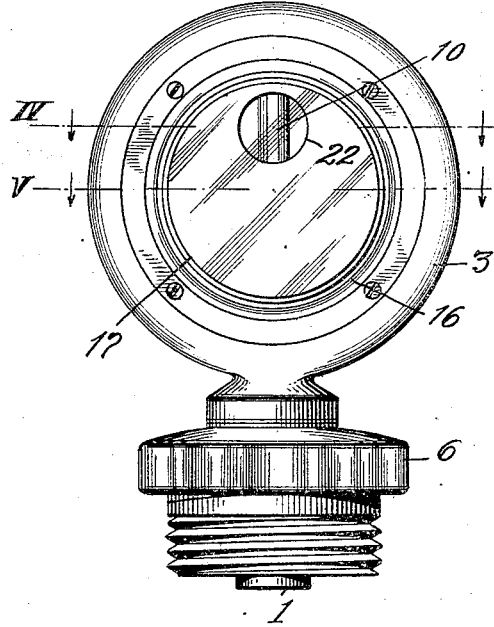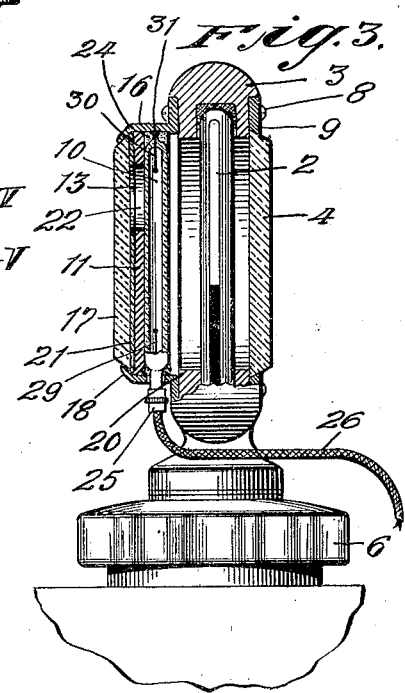

1,705,604

UNITED STATES PATENT OFFICE.

HARRISON H. BOYCE, OF JERICHO, NEW YORK.

ILLUMINATING DEVICE.

Application filed June 24, 1922. Serial No. 570,620.

This invention relates to illuminating devices for motor heat indicators.

It is particularly concerned with the illumination of instruments for indicating the temperatures of the internal combustion engines of motor vehicles and is in the nature of an improvement on the invention illustrated and described in my prior application for patent on illuminating devices, filed April 12, 1922, Serial No. 551,956. The said patent application contemplates, briefly, to provide an indicating instrument with an illuminating device consisting of a glow vessel in the form of a tube containing a rarefied gas and electrically connected to the terminal of a spark plug. The character of the gas and the degree of rarefication are such that the gas is caused to glow when subjected to the spark plug potential.

The present application relates to an improved manner of incorporating the said tube with a certain well-known form of motor temperature indicating instrument, the object being to locate the illuminating device in direct proximity to the indicating element of the instrument, so as to render the indications of the instrument very distinctly visible.

A good understanding of the above and various other features and objects of the invention may now be had from the following description thereof having particular reference to the accompanying drawings, in which, Figure 1 illustrates a front elevation of one form of instrument embodying my invention;

Figure 2 is a rear view of Figure 1;

Figure 3 is a longitudinal section of Figure 1;

Figures 4 and 5 are sections of Figure 2 on lines IV—IV and V—V, respectively, looking in the direction of the arrows; and Figure 6 is a view showing the instrument of the present invention mounted on the radiator cap of a motor vehicle, and operatively connected to a spark plug thereof.

Similar characters of reference designate similar parts in each of the several views.

The temperature-indicating instrument with which the illuminating instrument of the present invention is operatively associated is of a type well known in the art and therefore not described in detail. For the purpose of the present invention, it is sufficient to note that it consists of a thermometer comprising a bulb 1 and a stem 2, the stem being enclosed in a ring-shaped casing 3 having a glass face 4 by virtue of which the indications of the thermometer are rendered visible to the driver or other occupant of the vehicle. The casing 3 is provided with a base 5 whereby the same may be mounted upon a radiator cap 6 in such manner that the bulb 1 will extend into the top of the radiator 7 of the motor vehicle (see Figure 6). As indicated particularly in Figures 1 and 3, the glass face or crystal 4 of the instrument is retained in place by means of a bezel 9 secured to the annularly shaped casing 3 by means of screws 8.

The tube for illuminating the instrument is indicated by the numeral 10. It is mounted directly behind the stem 2 of the thermometer and parallel thereto, being secured in position by means of a block 11 of hard rubber or other suitable material having an elongated hole 12 providing a receptacle for accommodating and supporting the tube, this hole opening toward the face of the rubber block, as indicated at 12$^a$, so that the light from the tube will shine on the stem 2 of the thermometer located directly in front of the opening, as best illustrated in Figures 4 and 5. A ring 16 provided with a beveled outer flange 18 cooperates with the beveled edge of a crystal 17 to hold the block 11 firmly in engagement with the flange 20 of the casing. It should be understood that upon removal of the ring 16 and block 11, the crystal 17 which is of somewhat greater diameter than the opening in the frame 3 may be placed over the open side thereof and held in place by a bezel similar to bezel 9. A name plate 21 is interposed between the crystal and block 11. The face of block 11 is provided with markings or graduations 23 which cooperate with the thermometric column to indicate the temperature of the engine. The name plate and the block are provided with a circular transverse opening 22, the purpose of which is to render the column of the thermometric fluid very distinctly visible in daylight, when, owing to abnormal temperature conditions the column rises to such height as to pass beyond the lower limit of the opening 22.

The tube 10 is fixed rigidly in block 11, sealing material 24 being provided at the ends of the tube to retain the same in place. The lower end of the tube is associated by means of a detachable connector 25 with a wire 26, which wire leads to the terminal of a spark plug 27 of the engine, a condenser 28 or other impedance being preferably interposed in this connection to prevent a short-circuiting of the plug by an accidental grounding of wire 26.

The potential from the spark plug is thus communicated to an electrode 29 provided on the lower end of the tube and impressed on the rarefied gas, such as neon, in the interior of the tube. The upper end of the tube is connected to ground through an electrode 30, which, as indicated at 31, is metallically connected to the ring 16, which ring, by virtue of its connection with the casing 3 of the instrument, is connected to ground.

The potential of the spark plug will cause the gas in the tube to glow and thus illuminate the stem of the thermometer and render its indications plainly visible to the driver or other occupant of the vehicle. A portion of the light of the tube will be reflected by the stem 2 and directed on the face of block 11 and thus render the markings or graduations thereof readable at night.

It will be observed that by virtue of the shielding effect produced by the narrow opening 12$^a$ in the block and by the stem 2 of the thermometer, direct rays of light from the tube will be unable to pass out through the face of the instrument, particularly in the direction approximately normal to the face. The operator of the vehicle is thus not subjected to such direct rays and his vision of the dark road ahead is not impaired. The glow of the tube will be intermittent in character and have such low intensity as to produce a pleasing effect.

It should be noted that the illuminating device proper may conveniently be furnished as an attachment to existing temperature indicating instruments of the general character illustrated in the drawing. In such instruments the back cover consists merely of the crystal 17 and name plate 21, these parts being secured on the rear wall of the instrument by means of a bevelled ring similar to that indicated at 9 on the face of the instrument.

It will be observed that to provide such an instrument with the illuminating device of the present invention, it is necessary, merely, to remove the above-described back cover by unscrewing the attaching screws for the bevelled ring and substituting therefor the parts 10, 11, 21, 17 and 16. These parts may be furnished, as an assembled structure, or assembled on the spot by utilizing the old crystal 17 and the name plate 21, as will be readily understood.

Although I have herein shown and described only one specific form of embodiment of the invention, it will be readily understood that many changes and modifications may be made therein without departing from the spirit and scope of the invention, it being my intention to claim the same as broadly as the state of the prior art will permit, in whatever form its principle may be employed.

What I claim is:

1. In an attachment for illuminating a temperature indicating device, comprising a thermometer and a ring-shaped casing for enclosing the stem thereof, the combination of an elongated tube containing a rarefied gas adapted to glow when subjected to potential, and securing means for cooperating with said ring-shaped casing to secure said tube behind the stem of said thermometer, and means whereby the light from said tube is restricted to a beam directed on the said stem, said means comprising a block of material having said tube embedded therein, said block being provided with a narrow slot for exposing a portion of the surface of the tube.

2. An instrument for indicating the operating conditions of a motor vehicle, said instrument being comprised of a thermometer and a ring-shaped casing enclosing the stem of said thermometer, said attachment comprising an elongated tube containing a rarefied gas subject to glow when subjected to potential, a block for partially enclosing said tube, said block being provided with a narrow opening, a crystal, a name plate interposed between said crystal in said block and the rear wall of said block, and a clamping device for securing said block, name plate and crystal to the rear wall of the said casing.

3. The combination with a temperature indicating device including a stem of a ring shaped casing enclosing said stem, a pair of similar crystals for closing the open sides of said ring shaped casing, and thin elongated illuminating means between one of said crystals and said casing for illuminating the stem of said temperature indicating device said means being directly behind and in proximity to the stem and extending substantially parallel thereto for diffusing the light substantially uniformly around the stem.

4. The combination with a temperature indicating device including a stem, of a ring shaped casing enclosing said stem, a pair of similar crystals for closing the open sides of said ring shaped casing, means to secure one crystal to one side of said casing, means to support the other crystal spaced from the other side of said casing, means to support an elongated tube containing a rarefied gas adapted to glow when subjected to potential, said tube being positioned directly behind and substantially parallel to the said stem and between the latter crystal and said casing and means to connect said tube with a source of potential.

5. In combination, a motor heat indicator having a glass stem containing a movable indicating fluid, an enclosing casing completely surrounding said stem, said casing including a transparent crystal permitting observation of the stem from one side, an opaque body on the other side of the stem, said body having a recess alongside the stem, and an illuminating source carried in the recess, the walls of the recess shielding the illuminating source so that the direct light from said illuminating source falls solely on the stem to illuminate the stem.

6. In a motor heat indicator, an indicating means, a housing therefor which permits observation of the indicating means when the indicator is in the light, a lighting unit contained in said housing for illuminating the indicating medium, and light intercepting means to render the lighting unit invisible and so placed that the observer sees only the illuminated indicating means when the indicator is in the dark, said light intercepting means being in the form of an opaque wall of the housing having a recess alongside the stem to receive the lighting unit.

7. An attachment for a temperature observing device having a casing with a removable wall section, said attachment providing an extension for said casing and having a receptacle therein for supporting a suitable lamp and having a peripheral contour harmonizing with those of such casing and its removable wall section and being formed and arranged for interpositioning therebetween to thereby separate said movable wall section a sufficient distance from said casing to provide space for such a lamp, and a terminal for the supply of energy to said receptacle, said terminal extending through the wall of said member.

8. An attachment for a temperature observing device having a casing one of the walls of which is transparent and another of the walls of which is removably secured to said casing, said attachment comprising an extension for said casing and having a receptacle therein for supporting a suitable lamp and having a peripheral contour harmonizing with those of such casing and its removable wall and being formed and arranged for interpositioning therebetween to thereby separate said movable wall section a sufficient distance from said casing to provide space for such a lamp.

9. In an attachment for illuminating a temperature indicating device, comprising a thermometer and a ring-shaped casing for enclosing the stem thereof, the combination of an elongated tube containing a rarefied gas adapted to glow when subjected to potential, securing means for cooperating with said ring-shaped casing to secure said tube behind the stem of said thermometer, and means for restricting the light from said tube to a beam directed on said stem and including a member enclosing said tube to confine the light thereof but permitting escape of said light along a line opposite said stem and substantially parallel therewith.

10. The combination with a temperature indicating device including a stem, an open sided casing for enclosing said stem, transparent crystals for closing the sides of said casing, a thin elongated illuminating device directly behind and in proximity to said stem and extending substantially parallel thereto, a support for said illuminating device adapted for interposition between one of said crystals and the casing.

11. The combination with a motor heat indicator having a thermometer, a ring-shaped casing for enclosing the stem of the thermometer, and means for mounting the casing on a motor vehicle radiator, of an elongated tube containing a rarefied gas adapted to glow when subjected to potential, and securing means for said tube including a tube support engaging the adjacent side of said ring-shaped casing to secure said tube directly behind and adjacent the stem of said thermometer, and means whereby the light from said tube is restricted to a narrow vertical beam directed on the said stem.

In testimony whereof I have affixed my signature to this specification.

HARRISON H. BOYCE.